(12) United States Patent
Thaden et al.

(10) Patent No.: US 11,724,592 B2
(45) Date of Patent: Aug. 15, 2023

(54) FUEL DEVICE ASSEMBLIES AND VEHICLES INCLUDING SAME FOR MOUNTING A FUEL BAFFLE PLATE

(71) Applicant: Toyoda Gosei Co., Ltd., Kiyosu (JP)

(72) Inventors: Alexander Thaden, Oak Park, MI (US); Caleb Bauer, Brighton, MI (US); Steven Yurgalonis, Sterling Heights, MI (US)

(73) Assignee: TOYODA GOSEI CO., LTD., Kiyosu (JP)

( * ) Notice: Subject to any disclaimer, the term of this patent is extended or adjusted under 35 U.S.C. 154(b) by 0 days.

(21) Appl. No.: 17/495,976

(22) Filed: Oct. 7, 2021

(65) Prior Publication Data
US 2023/0114490 A1    Apr. 13, 2023

(51) Int. Cl.
*B60K 15/05*     (2006.01)
*B60K 15/035*    (2006.01)
*B60K 15/04*     (2006.01)
*B60K 15/077*    (2006.01)
*B60K 15/03*     (2006.01)

(52) U.S. Cl.
CPC ........ *B60K 15/05* (2013.01); *B60K 15/03519* (2013.01); *B60K 15/0406* (2013.01); *B60K 15/077* (2013.01); *B60K 2015/0344* (2013.01); *B60K 2015/03289* (2013.01); *B60K 2015/0777* (2013.01)

(58) Field of Classification Search
CPC .............. B60K 15/05; B60K 15/03519; B60K 15/0406; B60K 15/077; B60K 2015/0777; B60K 2015/03289; B60K 2015/0344
USPC ......................................................... 220/56.3
See application file for complete search history.

(56) References Cited

U.S. PATENT DOCUMENTS

| 7,913,712 B2 | 3/2011 | Vulkan et al. |
| 10,851,747 B2 | 12/2020 | Solano et al. |
| 2020/0032748 A1* | 1/2020 | Solano ................... F16K 31/22 |

FOREIGN PATENT DOCUMENTS

| CN | 110072723 A | * | 7/2019 | ............. B60K 15/03 |
| KR | 101183036 B1 | * | 9/2012 | |
| WO | WO-2019012022 A1 | * | 1/2019 | ........... B60K 15/077 |

\* cited by examiner

*Primary Examiner* — Mahmoud Gimie
(74) *Attorney, Agent, or Firm* — Dinsmore & Shohl LLP

(57) ABSTRACT

A fuel device assembly including a valve assembly and a baffle plate, the valve assembly including a valve cover and a first weld plate provided at an upper end of the valve cover coupling the valve assembly to an interior-facing surface a fuel tank of a vehicle, the baffle plate including a body having a plurality of spaced apart holes formed therein and a housing member extending from the body for receiving and lockingly engaging the valve assembly.

20 Claims, 6 Drawing Sheets

FUEL DEVICE ASSEMBLIES AND VEHICLES INCLUDING SAME FOR MOUNTING A FUEL BAFFLE PLATE

TECHNICAL FIELD

The present specification generally relates to a fuel device assembly mounted within a fuel tank of a vehicle and, more specifically, a valve assembly for mounting a baffle plate to the fuel tank of the vehicle.

BACKGROUND

In automobiles, a baffle plate for suppressing waving of liquid fuel is arranged within a fuel tank in which liquid fuel is stored. In addition, a valve assembly including a plurality of components is arranged in the fuel tank. Examples of the valve assembly include a vehicle grade-vent valve for allowing fuel tanks to vent properly when the vehicle is parked on a grade.

When the baffle plate and the fuel device are mounted in the fuel tank, first, a holding unit (attachment) is mounted in the fuel tank. Then, the baffle plate and the fuel device are mounted on the holding unit. This complicates the mounting work and poses a problem in terms of the efficiency of the mounting work. Alternatively, the baffle plate itself may be mounted, such as by welding, to the fuel tank and the valve assembly may be secured to the baffle plate. However, this requires the baffle plate to include additional, complicated structure, which increases the cost of manufacturing the baffle plate.

Accordingly, a need exists for improved fuel device assemblies facilitating attachment of the baffle plate to the fuel tank without requiring additional attachment components on the baffle plate itself.

SUMMARY

In one embodiment, a fuel device assembly includes: a valve assembly including: a valve cover; and a first weld plate provided at an upper end of the valve cover coupling the valve assembly to an interior-facing surface a fuel tank of a vehicle; a baffle plate including: a body having a plurality of spaced apart holes formed therein; and a housing member extending from the body for receiving and lockingly engaging the valve assembly.

In another embodiment, a vehicle includes: a fuel tank defining an interior; and a fuel device assembly provided within the interior of the fuel tank, the fuel device assembly including: a valve assembly including: a valve cover; and a first weld plate provided at an upper end of the valve cover coupling the valve assembly to an interior-facing surface of the fuel tank; a baffle plate including: a body having a plurality of spaced apart holes formed therein; and a housing member extending from the body for receiving and lockingly engaging the valve assembly.

In yet another embodiment, a method includes: providing a valve assembly including: a valve cover; and a first weld plate provided at an upper end of the valve cover; providing a baffle plate including: a body having a plurality of spaced apart holes formed therein; and a housing member extending from the body; and positioning the valve assembly within the housing member of the baffle plate to couple the valve assembly to the housing member; and welding the valve assembly to an interior-facing surface of a fuel tank of a vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
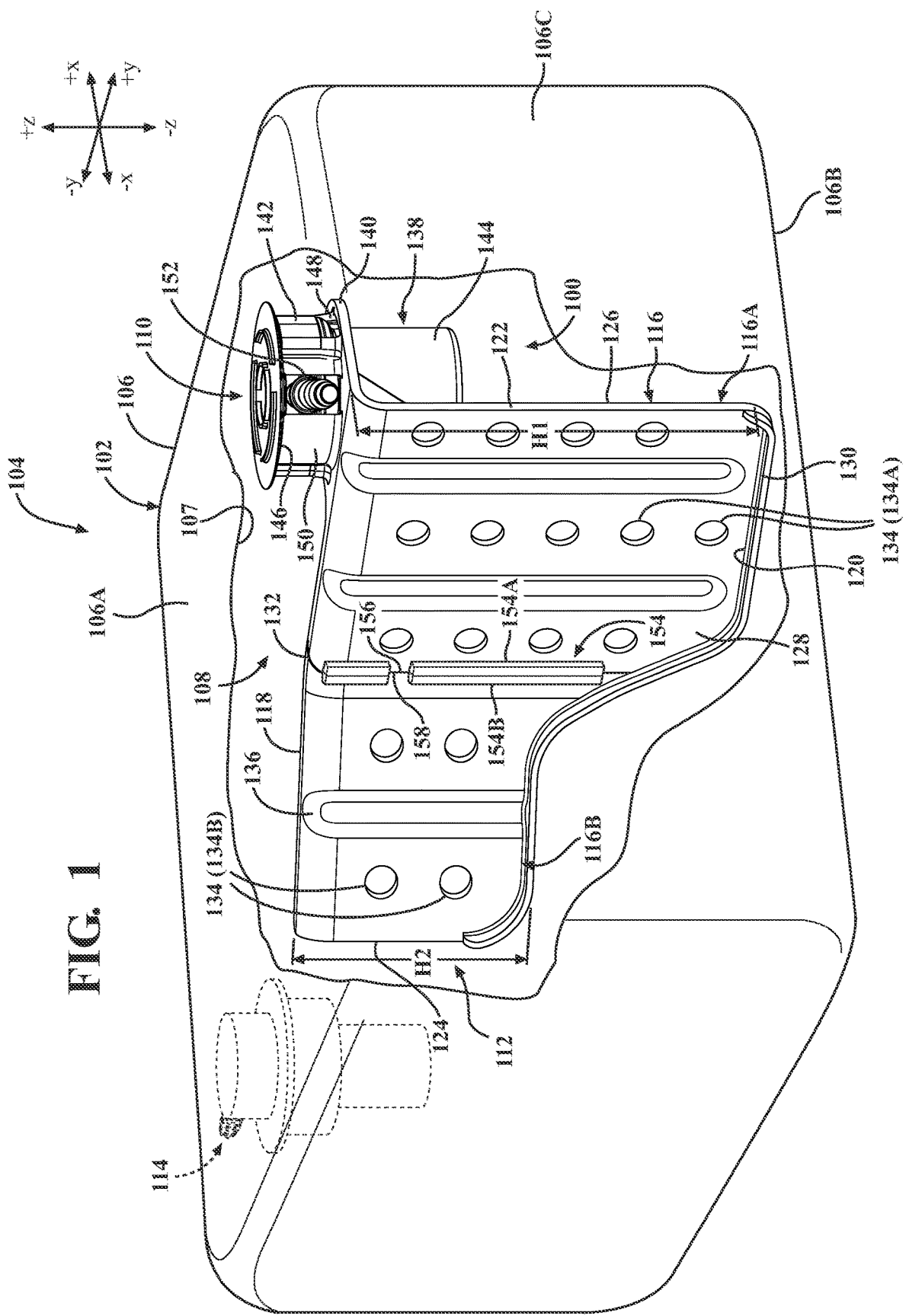
FIG. 1 schematically depicts a perspective view of a fuel device assembly positioned within a fuel tank of a vehicle, according to one or more embodiments shown and described herein.

Embodiments described herein are directed to fuel device assemblies, vehicles including fuel device assemblies, and methods for fixing fuel device assemblies within a fuel tank. The fuel device assemblies include a valve assembly mounted to an interior-facing surface of the fuel tank and a baffle plate including a housing member that receives the valve assembly. Thus, the baffle plate is indirectly coupled to the fuel tank by the valve assembly, which lockingly engages the housing member of the baffle plate.

Various embodiments of the fuel device assemblies and method of attaching the fuel device assemblies to a fuel tank of a vehicle are described in more detail herein. Whenever possible, the same reference numerals will be used throughout the drawings to refer to the same or like parts.

As used herein, the term "vehicle longitudinal direction" refers to the forward-rearward direction of the vehicle (i.e., in the +/−Y direction of the coordinate axes depicted in FIG. 1). The term "vehicle lateral direction" refers to the cross-vehicle direction (i.e., in the +/−X direction of the coordinate axes depicted in FIG. 1), and is transverse to the vehicle longitudinal direction. The term "vehicle vertical direction" refers to the upward-downward direction of the vehicle (i.e., in the +/−Z direction of the coordinate axes depicted in FIG. 1). As used herein, "upper" and "above" are defined as the positive Z direction of the coordinate axes shown in the drawings. "Lower" and "below" are defined as the negative Z direction of the coordinate axes shown in the drawings. It is appreciated that the vehicle lateral direction and the vehicle longitudinal direction may be interchanged based on the installation direction of the fuel tank with respect the vehicle.

Referring now to FIG. 1, a fuel device assembly 100 is illustrated according to one or more embodiments described herein. The fuel device assembly 100 is mounted within a fuel tank 102 of a vehicle 104. The fuel tank 102 includes one or more walls 106 such as a top wall 106A, an opposite bottom wall 106B, and a plurality of side walls 106C. The one or more walls 106 of the fuel tank 102 define an interior 108 in which the fuel device assembly 100 is provided. The fuel device assembly 100 may generally include a valve assembly 110 and a baffle plate 112 to which the valve assembly 110 is coupled. As described in more detail herein, the valve assembly 110 is mounted to an interior-facing surface 107 of one of the walls 106, such as the top wall 106A, of the fuel tank 102 such that the baffle plate 112 is spaced apart from the walls 106 of the fuel tank 102. However, it should be appreciated that the valve assembly 110 may be mounted to any suitable portion of the fuel tank 102 such as, for example a side wall 106C of the fuel tank 102. In embodiments, the valve assembly 110 is a vehicle grade vent valve, which allows the fuel tank 102 to properly vent when the vehicle 104 is parked on an incline. In embodiments, the valve assembly 110 coupled to the baffle plate 112 is any suitable valve other than a fuel shut-off valve. In embodiments, the valve assembly 110 coupled to the baffle plate 112 is not a fuel shut-off valve. As is known in the art, fuel shut-off valves operate as a full-tank detection valve for detecting the full-tank state during refueling. Additionally, fuel shut-off valves function as a cutoff valve for preventing liquid fuel from flowing into an evaporation circuit while driving or being transported. In embodiments, a fuel shut-off valve 114 is also provided within the fuel tank 102 separate from and spaced apart from the baffle plate 112. Thus, in embodiments, the vehicle 104 may include two valves, for example, a vehicle grade vent valve and a fuel shut-off valve, both mounted to an interior-facing surface 107 of the fuel tank 102.

Referring still to FIG. 1, the baffle plate 112 includes a body 116 having an upper edge 118, an opposite lower edge 120, a first side 122 and an opposite second side 124 extending between the upper edge 118 and the lower edge 120, a first surface 126, and an opposite second surface 128. The first surface 126 and the second surface 128 of the body 116 define a thickness of the baffle plate 112. In embodiments, a lip 130 is formed at the lower edge 120 and extends in a direction opposite the first surface 126. The body 116 of the baffle plate 112 may have a substantially flat shape that extends in a vehicle vertical direction when coupled to the fuel tank 102. However, as shown, the body 116 of the baffle plate 112 may have one or more bends 132 formed therein such that the baffle plate 112 has a curvature. In embodiments, the baffle plate 112 may be formed of plastic, metal, or any other material suitable for withstanding wear from liquid fuel stored within the fuel tank 102.

A plurality of holes 134 are formed in the body 116 and extend through the first surface 126 and the second surface 128 in a thickness direction. The holes 134 are spaced apart from one another. In embodiments, the holes 134 may be equidistantly spaced apart from one another in the vehicle vertical direction and arranged in a plurality of columns extending between the upper edge 118 and the lower edge 120, as well as a plurality of rows extending between the first side 122 and the second side 124. It should be appreciated that the body 116 of the baffle plate 112 operates to suppress waving of liquid fuel stored in the fuel tank 102 by applying resistance to the liquid fuel when the liquid fuel passes through the holes 134. As shown, a first height H1 of the baffle plate 112 extending in the vehicle vertical direction at the first side 122 is greater than a second height H2 of the baffle plate 112 extending the vehicle vertical direction at the second side 124. Thus, a greater number of holes 134 are formed proximate the first side 122 of the baffle plate 112 as compared to the number of holes 134 formed proximate the second side 124 of the baffle plate 112. However, the shape of the baffle plate 112 is not limited to that illustrated herein. Accordingly, the shape of the baffle plate 112 may be modified based on the size and shape of the fuel tank 102.

Additionally, a plurality of grooves 136 may be formed in the baffle plate 112, particularly extending in the thickness direction toward the first surface 126, thereby forming protrusions, not shown, extending from the first surface 126 in a direction opposite the second surface 128. The grooves 136 may extend along a substantial portion of the baffle plate 112 in the vehicle vertical direction from the upper edge 118 to the lower edge 120 or, alternatively, along only a portion of the baffle plate 112 in the vehicle vertical direction. As shown, the grooves 136 are equidistantly spaced apart from one another between the first side 122 and the second side 124.

Referring still to FIG. 1, the baffle plate 112 includes a housing member 138 extending from the first surface 126 in a direction opposite the second surface 128. With more particularity, the housing member 138 includes a medial wall 140 extending from the upper edge 118 of the baffle plate 112. In embodiments, the medial wall 140 extends perpendicular to the body 116 of the baffle plate 112. The housing member 138 includes an upper housing portion 142 extending upwardly from the medial wall 140 and a lower housing portion 144 extending downwardly from the medial wall 140. The upper housing portion 142 has an open top end 146 for receiving the valve assembly 110, described in more detail herein. The housing member 138, including the medial wall 140, the upper housing portion 142, and the lower housing portion 144, is integrally formed as a one-piece, monolithic structure with the body 116 of the baffle plate 112. As shown, the valve assembly 110 is received within the housing member 138. The upper housing portion 142 has one or more openings 148 formed in a circumferential body 150 of the upper housing portion 142 of the housing member 138 for lockingly engaging the valve assembly 110. The upper housing portion 142 also has one or more windows 152 for permitting a portion of the valve assembly 110, particularly a nipple 182, shown in FIG. 2, to extend through the upper housing portion 142 of the housing member 138. Thus, the valve assembly 110 may be coupled to the interior-facing surface 107 of the fuel tank 102, particularly the interior-facing surface 107 of the top wall 106A of the fuel tank 102, such that the baffle plate 112 may be indirectly fixed to the fuel tank 102 without directly fixing any portion of the baffle plate 112 itself to the fuel tank 102. This permits the valve assembly 110 to be initially attached to the fuel tank 102 and subsequently attaching the baffle plate 112 to the valve assembly 110.

In embodiments, the baffle plate 112 may include a plurality of individual body portions removably attached to one another such that the baffle plate 112 may have a modular configuration. As shown, the baffle plate 112 includes a first body portion 116A in which a first subset of the plurality of holes 134 are formed and a second body portion 116B in which a second subset of the plurality of holes 134 are formed. In embodiments, the first body portion 116A and the second body portion 116B each includes corresponding locking mechanisms 154 such as, for example, clasps, buckles, threaded fasteners, magnets, and the like, so that the second body portion 116B may be attached to the first body portion 116A. In embodiments, the locking mechanisms 154 may include a male locking mechanism 154A provided on the first body portion 116A and a female locking mechanism 154B provided on the second body portion 116B for receiving the male locking mechanism 154A. As shown, the locking mechanisms 154 extend along a vertical edge 156 of the first body portion 116A and an adjacent vertical edge 158 of the second body portion 116B. This modular configuration allows for the baffle plate 112 to have a variety of different shapes and sizes by attaching two or more body portions to one another. In addition, the modular configuration allows for additional baffle portions to be attached to the baffle plate 112 after the baffle plate 112 is attached, indirectly by the valve assembly 110, to the fuel tank 102.

Figure 2:
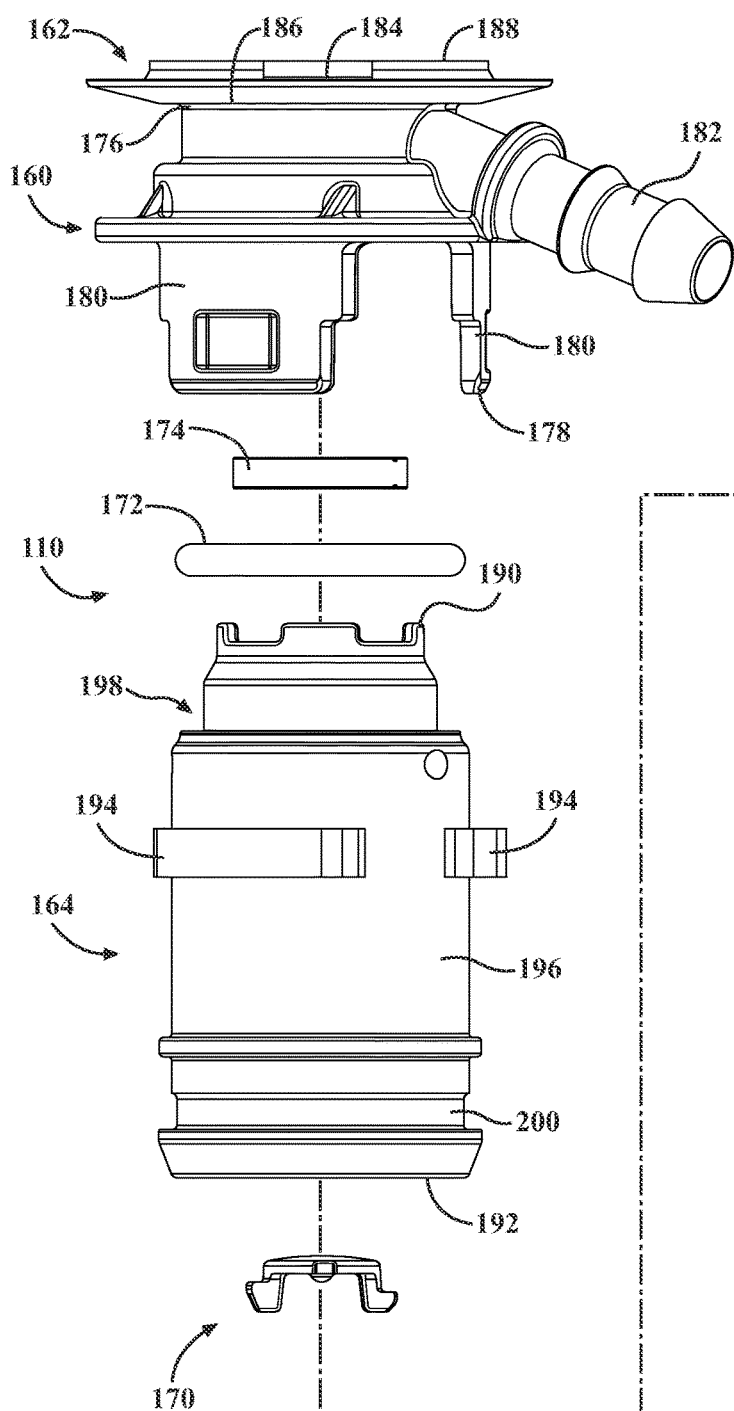
FIG. 2 schematically depicts an exploded view of a valve assembly of the fuel device assembly of FIG. 1, according to one or more embodiments shown and described herein.
Figure 2:
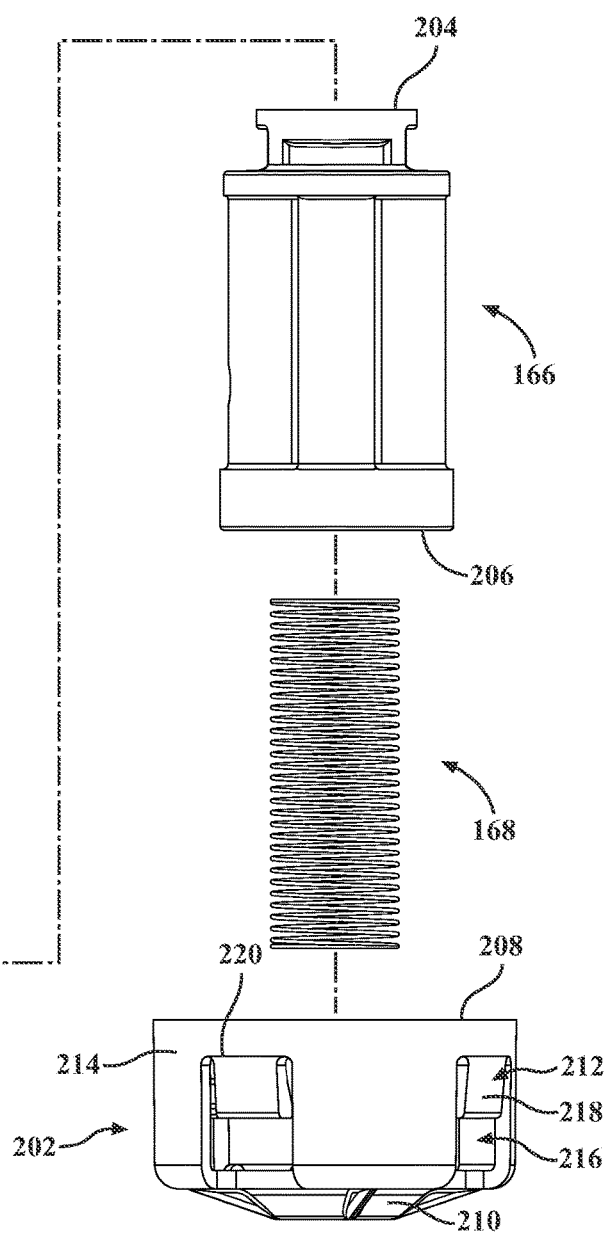

Referring now to FIG. 2, an exploded view of the valve assembly 110 is shown separate from the baffle plate 112. In embodiments, the valve assembly 110 includes a valve cover 160, a first weld plate 162, a case 164, a lower float 166 positionable within the case 164, a biasing member 168 positionable within the lower float 166, an upper float 170 positionable within the case 164 and above the lower float 166, an O-ring 172, and a metal disc 174. In embodiments, the components of the valve assembly 110, other than the metal disc 174 and the O-ring 172, may be formed of plastic.

The valve cover 160 has an upper end 176 and an opposite lower end 178 defining a plurality of fingers 180 for lockingly engaging the case 164, as described in more detail herein. The nipple 182 extends from the valve cover 160 at the upper end 176 thereof and outwardly in a radial direction. It should be appreciated that the nipple 182 transports gas into a canister, not shown, to prevent a rise in gas pressure within the fuel tank 102.

The first weld plate 162 is provided at the upper end 176 of the valve cover 160 and includes an upper surface 184 opposite the valve cover 160, and an opposite lower surface 186. In embodiments, the first weld plate 162 is integrally formed as a one-piece, monolithic structure with the valve cover 160 such that the first weld plate 162 and the valve cover 160 are integrally molded as a one-piece, monolithic structure. In other embodiments, the lower surface 186 of the first weld plate 162 is mounted or otherwise fixed to the upper end 176 of the valve cover 160. The first weld plate 162 includes a first weld pad 188 formed at the upper surface 184 of the first weld plate 162 for fixing the first weld plate 162 and, thus, the valve assembly 110, to the fuel tank 102.

The case 164 has a substantially tubular shape and includes an open upper end 190 and an opposite open lower end 192. A plurality of receiving slots 194 is formed on an outer circumferential surface 196 of the case 164 for engaging the valve cover 160, specifically the fingers 180 of the valve cover 160. The receiving slots 194 are spaced apart from each other in a circumferential direction. Each receiving slot 194 protrudes from the circumferential surface 196 of the case 164 outward in a radial direction. The case 164 has a reduced diameter portion 198 at the upper end 190 for receiving the O-ring 172 and a groove 200 formed at the lower end 192 of the case 164 for engaging a bottom cap 202, described in more detail herein.

The lower float 166 also has a substantially tubular shape and includes an open upper end 204 and an open lower end 206. The upper float 170 is positionable within the upper end 204 of the lower float 166. The biasing member 168, for example, a spring, extends through the lower end 192 of the case 164 and the lower end 206 of the lower float 166 to bias the lower float 166 toward the upper end 190 of the case 164 when the valve assembly 110 is positioned within the housing member 138 of the baffle plate 112. As such, the biasing member 168 is at least partially positioned within the case 164.

The biasing member 168 is retained in position within the lower float 166 by the bottom cap 202, which lockingly engages the case 164. In embodiments, the bottom cap 202 is an individual component separate from the housing member 138 of the baffle plate 112. The bottom cap 202 has an open upper end 208 and a tapered bottom end 210. A plurality of engaging members 212 is formed on an outer circumferential surface 214 of the bottom cap 202 for engaging the groove 200 formed at the lower end 192 of the case 164. The engaging members 212 are spaced from each other in a circumferential direction. Each engaging member 212 defines a cutout 216 and a locking claw 218 extending from an upper edge 220 of the engaging member 212 defining the cutout 216. The locking claw 218 extends radially inwardly from the upper edge 220 of the engaging member 212 and is resiliently attached to the upper edge 220 of the engaging member 212. Thus, the locking claws 218 are capable of flexing outwardly to permit the case 164 to be received and seated within the bottom cap 202 and the locking claws 218 engage the groove 200 formed at the lower end 192 of the case 164 once the case 164 is fully seated within the bottom cap 202.

Figure 3:
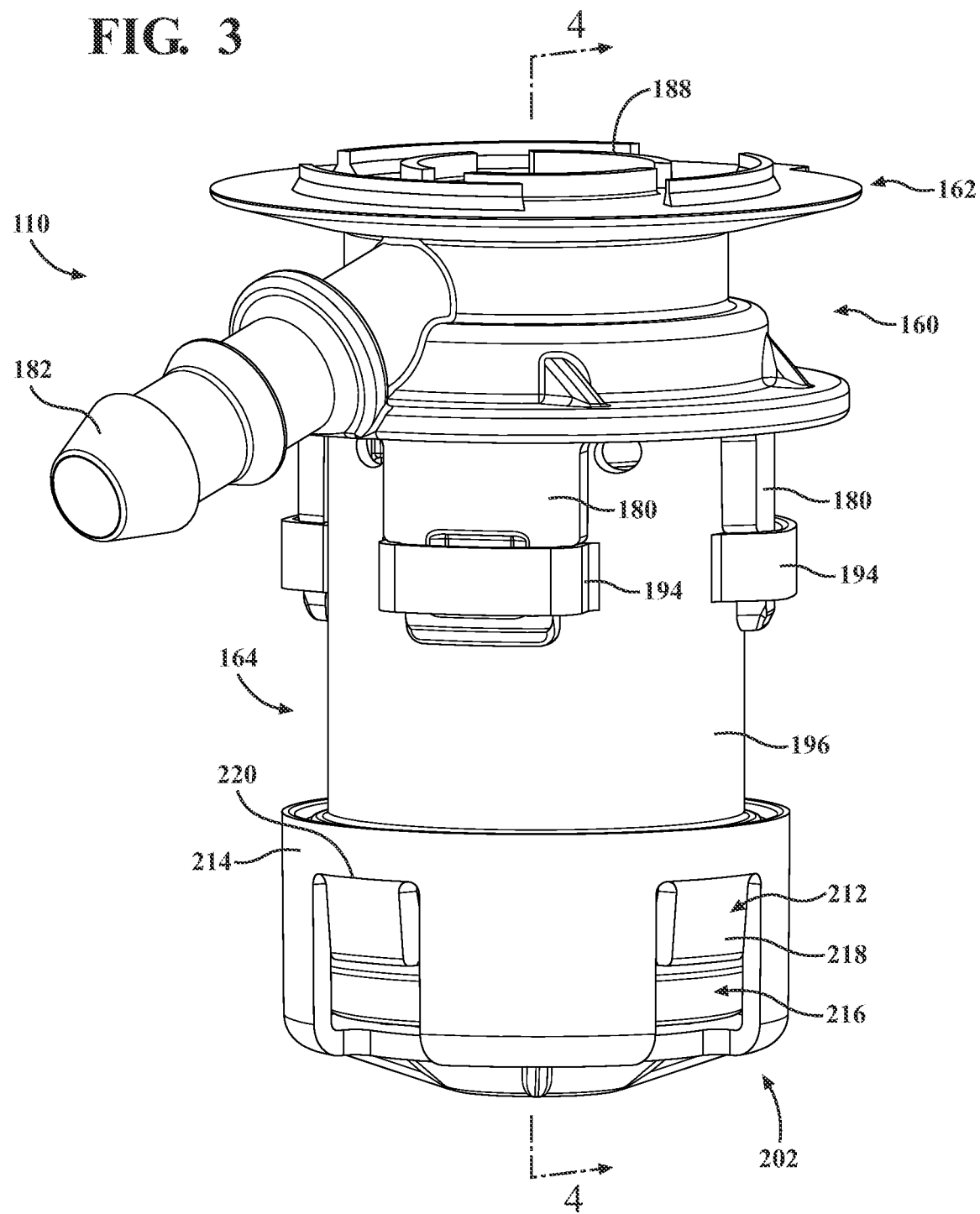
FIG. 3 schematically depicts a perspective view of the valve assembly of FIG. 2 in an assembled state, according to one or more embodiments shown and described herein.

As shown in FIG. 3, the valve assembly 110 is shown in an assembled state with the valve cover 160 positioned at the upper end 190 (FIG. 2) of the case 164 such that the fingers 180 each extend within and engage a corresponding one of the receiving slots 194 to lockingly engage the valve cover 160 to the case 164. Additionally, the case 164 is shown fully seated within the bottom cap 202 such that the locking claw 218 of each of the engaging members 212 engages the groove 200 formed in the case 164, thereby locking the bottom cap 202 to the case 164.

Figure 4:
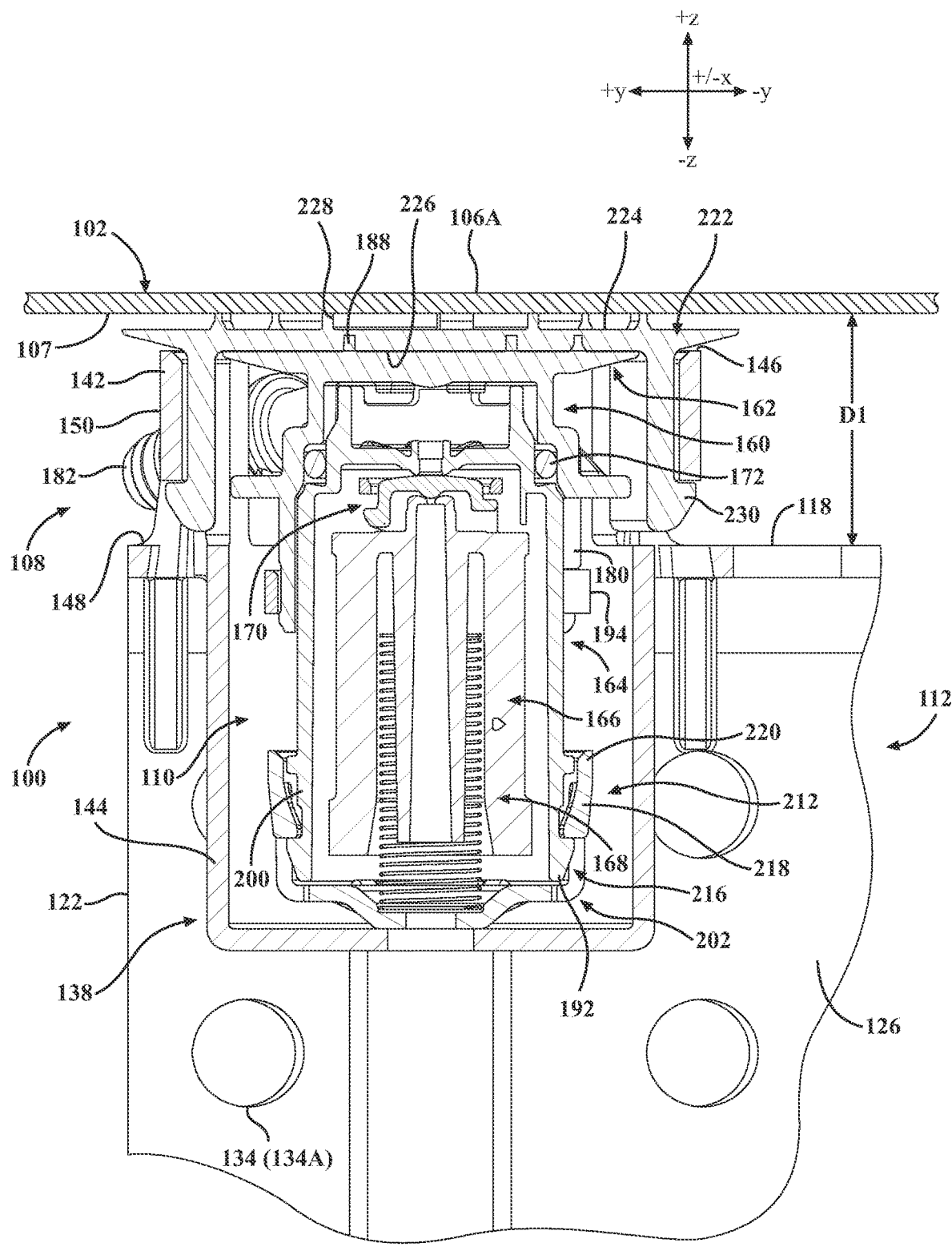
FIG. 4 schematically depicts a cross-sectional view of the valve assembly of FIG. 2 taken along line 4-4 of FIG. 3 and positioned within the fuel tank, according to one or more embodiments shown and described herein.

Referring now to FIG. 4, the valve assembly 110 is shown in the assembled state and positioned within the housing member 138 of the baffle plate 112. Additionally, the bottom cap 202, which is shown fixed to the lower end 192 of the case 164, is positioned within the housing member 138 as well. It should be appreciated that, in this embodiment, the bottom cap 202 is a separate component from the housing member 138. As shown, the bottom cap 202 is provided within the housing member 138 such that the bottom cap 202 is positioned below the upper edge 118 of the baffle plate 112 in the vehicle vertical direction. Additionally, in embodiments, the lower float 166 and the biasing member 168 are also positioned below the upper edge 118 of the baffle plate 112 in the vehicle vertical direction due to the distance between the upper edge 118 of the baffle plate 112 and the bottom cap 202.

To secure the valve assembly 110 to the baffle plate 112, specifically the housing member 138, the valve assembly 110 further includes a second weld plate 222 having an upper surface 224 and an opposite lower surface 226. The lower surface 226 of the second weld plate 222 is welded or otherwise secured to the first weld pad 188 of the first weld plate 162 to secure the second weld plate 222 to the first weld plate 162 and, thus, the other components of the valve assembly 110. The upper surface 224 of the second weld plate 222 also includes a second weld pad 228 for securing the second weld plate 222 and, thus, the other components of the valve assembly 110, to the fuel tank 102. The second weld plate 222 includes one or more hooks 230 extending from the lower surface 226 of the second weld plate 222 in a direction opposite the upper surface 224 for engaging corresponding openings 148 formed in the circumferential body 150 of the upper housing portion 142 of the housing member 138 and lockingly engaging the housing member 138. As shown, the second weld plate 222 includes a plurality of hooks 230 extending from the lower surface 226 with each hook 230 being received within a corresponding opening 148 formed in the circumferential body 150 of the upper housing portion 142 of the housing member 138. In embodiments, the second weld plate 222 may be integrally formed as a one-piece, monolithic structure with the first weld plate 162.

In embodiments, the second weld plate 222 is welded to the first weld plate 162 and the assembled valve assembly 110 may be welded to the interior-facing surface 107 of the fuel tank 102 such as, for example, the top wall 106A of the fuel tank 102, as shown. Thereafter, the baffle plate 112 may be positioned relative to the valve assembly 110 such that the hooks 230 of the second weld plate 222 lockingly engage the housing member 138 to couple the baffle plate 112 to the valve assembly 110. In other embodiments, the baffle plate 112 may be coupled to the valve assembly 110 by engaging the hooks 230 of the second weld plate 222 with the housing member 138 of the baffle plate 112 prior to fixing the second weld plate 222 to the interior-facing surface 107 of the fuel tank 102. In any event, it should be appreciated that the baffle plate 112 is not directly fixed to the fuel tank 102. Rather, the valve assembly 110 is directly fixed to the fuel tank 102 and the baffle plate 112 is coupled to the fuel tank 102 by the valve assembly 110. This eliminates the need for additional attachments points, such as weld pads, formed on the baffle plate 112 for attaching the baffle plate 112 directly to the fuel tank 102. Additionally, this allows the baffle plate 112 to be repaired and/or replaced if necessary without having to detach the valve assembly 110 from the fuel tank 102. As a result of the baffle plate 112 being indirectly coupled to the fuel tank 102, the baffle plate 112 is spaced apart from the fuel tank 102 by at least the second weld plate 222. More particularly, the upper edge 118 of the baffle plate 112 is spaced apart from the interior-facing surface 107 of the fuel tank 102 by a first distance D1.

Figure 5:
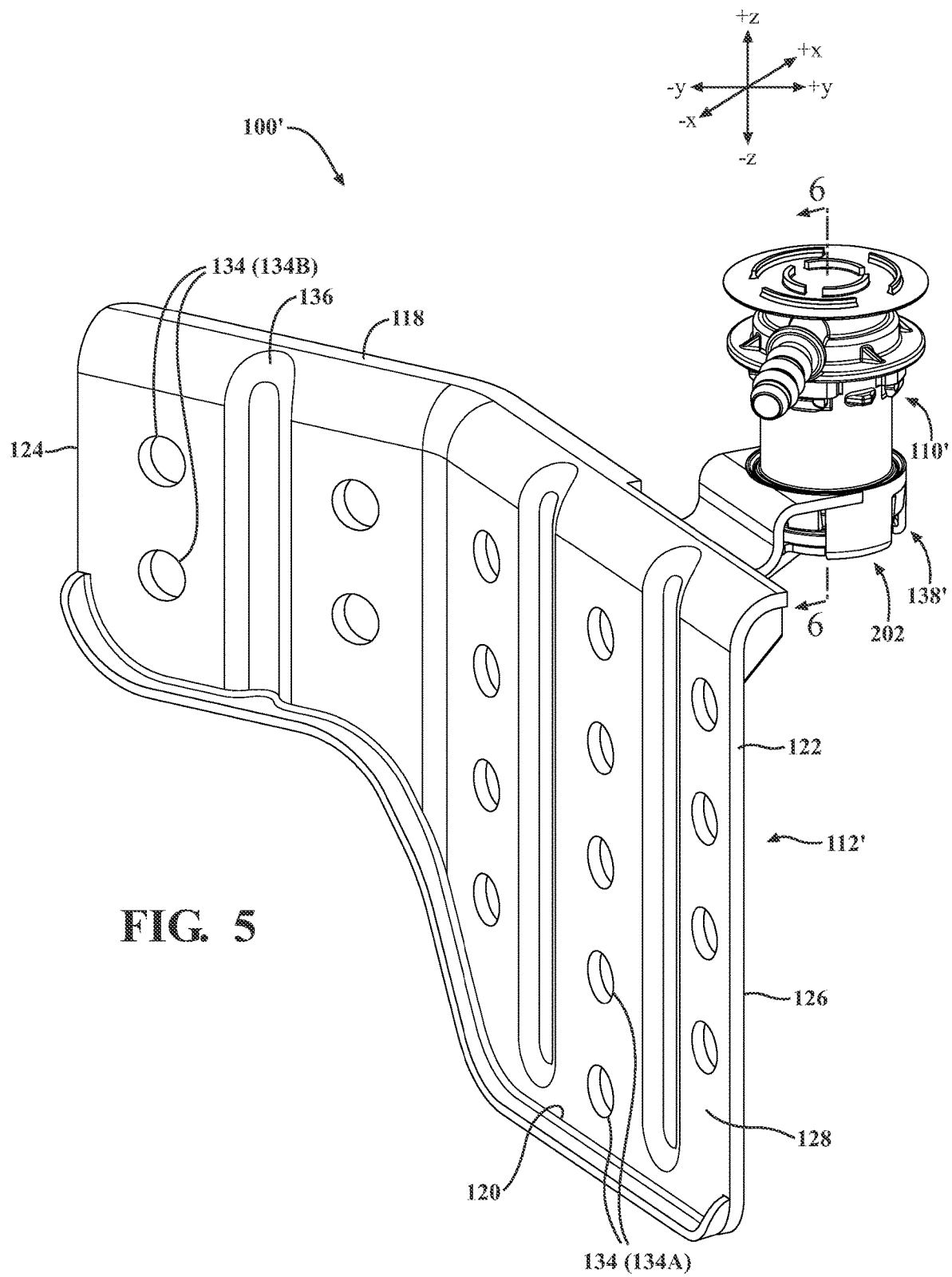
FIG. 5 schematically depicts another embodiment of a fuel device assembly positioned within the fuel tank of the vehicle, according to one or more embodiments shown and described herein.
Figure 6:
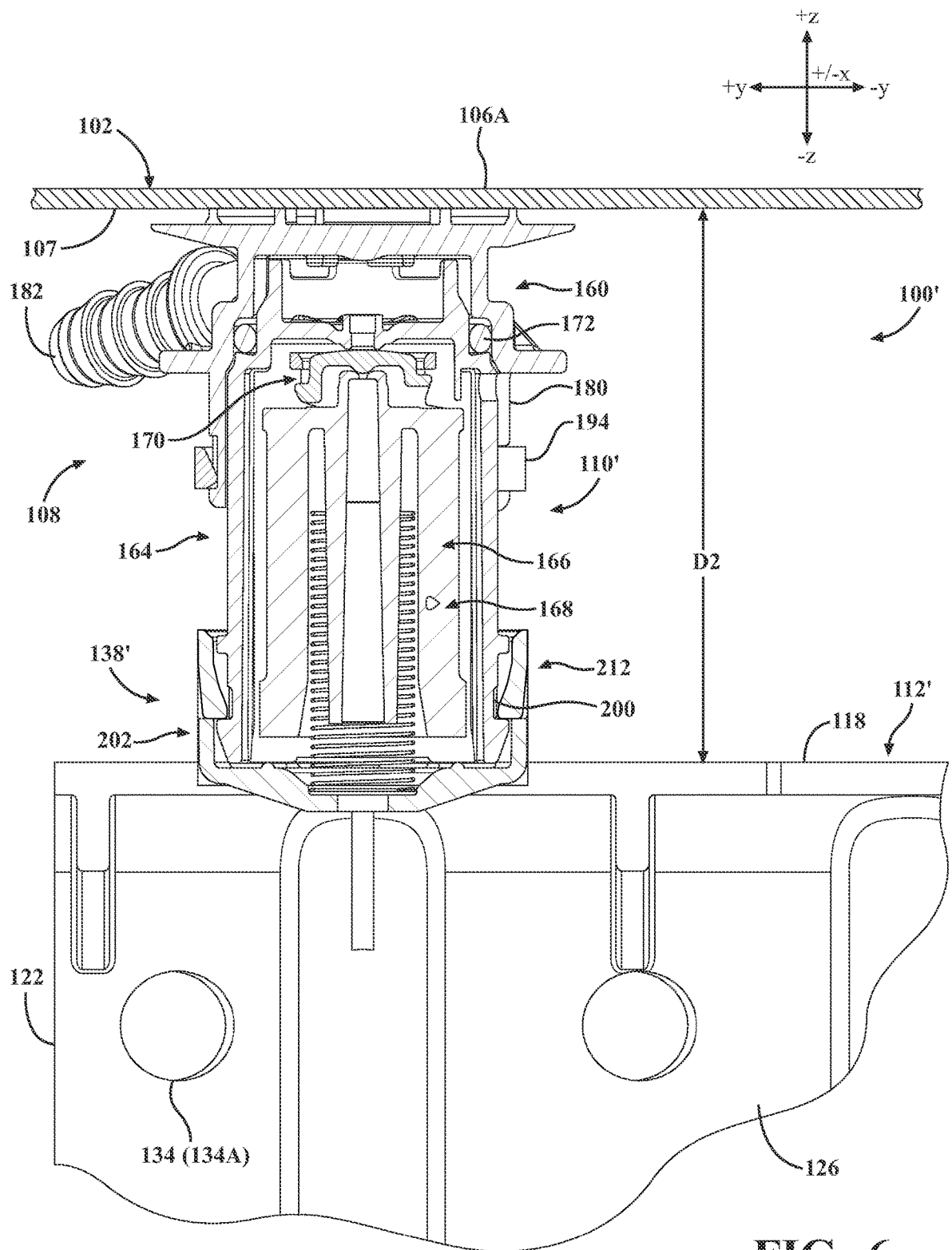
FIG. 6 schematically depicts a cross-sectional view of the fuel device assembly of FIG. 5 taken along line 6-6 of FIG. 5 and positioned within the fuel tank, according to one or more embodiments shown and described herein.

Referring now to FIGS. 5 and 6, another embodiment of a fuel device assembly 100' is shown in which the fuel device assembly 100' includes a valve assembly 110' and a baffle plate 112' including a housing member 138'. The fuel device assembly 100' is similar to the fuel device assembly 100 discussed herein. Therefore, like reference numbers will be used to refer to like parts.

In the embodiment of the fuel device assembly 100' illustrated in FIGS. 5 and 6, the bottom cap 202 is integrally formed as a one-piece, monolithic structure with the housing member 138' extending from the baffle plate 112'. This differs from the fuel device assembly 100 illustrated in FIG. 4 in which the bottom cap 202 is a separate component from the housing member 138 of the baffle plate 112. Due to the bottom cap 202 being integrally formed with the housing member 138' of the baffle plate 112', the valve assembly 110' is fixed to the baffle plate 112' at the housing member 138' by the bottom cap 202 engaging the groove 200 formed in the case 164 of the valve assembly 110', as described herein with respect to the valve assembly 110. Accordingly, this eliminates the need for the second weld plate 222, which is utilized to attach the valve assembly 110 to the housing member 138. Eliminating the second weld plate 222, as well as additional components necessary to fix the baffle plate 112' to the fuel tank 102, reduces the manufacturing cost and time for producing the fuel device assembly 100'.

As shown, the upper edge 118 of the baffle plate 112' is spaced apart from the interior-facing surface 107 of the fuel tank 102 by a second distance D2, which is greater than the first distance D1 (FIG. 4). Stated another way, the vertical position of the bottom cap 202 of the valve assembly 110' relative to the upper edge 118 of the baffle plate 112' is higher than the vertical position of the bottom cap 202 of the valve assembly 110. As such, the lower float 166 is positioned above the upper edge 118 of the baffle plate 112' in the vehicle vertical direction.

From the above, it is to be appreciated that defined herein are fuel device assemblies, vehicles including fuel device assemblies, and methods for fixing fuel device assemblies within a fuel tank. In particularly, the fuel device assemblies include a valve assembly mounted to an interior-facing surface of the fuel tank and a baffle plate including a housing member that receives the valve assembly. Thus, the baffle plate is indirectly coupled to the fuel tank by the valve assembly, which lockingly engages the housing member of the baffle plate. This eliminates the need for extraneous components on the baffle plate to permit the baffle plate to be fixed to the fuel tank, thereby reducing manufacturing cost and time.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A fuel device assembly comprising:
a valve assembly comprising:
a valve cover; and
a weld plate provided at an upper end of the valve cover coupling the valve assembly to an interior-facing surface a fuel tank of a vehicle;
a baffle plate comprising:
a body having a plurality of spaced apart holes formed therein; and
a housing member extending from the body for receiving the valve assembly, the housing member including an upper housing portion and a lower housing portion, the weld plate lockingly engaging the upper housing portion.

2. The fuel device assembly of claim 1, wherein the valve assembly further comprises:
a biasing member; and
a case in which the biasing member is at least partially positioned, the case having an upper end and an opposite lower end,
wherein the valve cover is positioned at the upper end of the case and lockingly engages the case.

3. The fuel device assembly of claim 2, wherein the valve assembly further comprises:
a lower float positioned within the case; and
an upper float positioned within the case, the biasing member positioned within the lower float.

4. The fuel device assembly of claim 2, further comprising a bottom cap positioned at the lower end of the case and lockingly engaging the case.

5. The fuel device assembly of claim 4, wherein the bottom cap is formed as a one-piece, monolithic structure with the housing member of the baffle plate.

6. The fuel device assembly of claim 1, wherein the body of the baffle plate comprises:
 a first body portion having a first subset of the plurality of spaced apart holes formed therein; and
 a second body portion removably attached to the first body portion, the second body portion having a second subset of the plurality of spaced apart holes formed therein.

7. The fuel deice of claim 2, wherein the valve cover and the case are entirely positioned within the housing member.

8. A vehicle comprising:
 a fuel tank defining an interior; and
 a fuel device assembly provided within the interior of the fuel tank, the fuel device assembly comprising:
  a valve assembly comprising:
   a valve cover; and
   a weld plate provided at an upper end of the valve cover coupling the valve assembly to an interior-facing surface of the fuel tank;
  a baffle plate comprising:
   a body having a plurality of spaced apart holes formed therein; and
   a housing member extending from the body for receiving the valve assembly, the housing member including an upper housing portion and a lower housing portion, the weld plate lockingly engaging the upper housing portion.

9. The vehicle of claim 8, further comprising a fuel shut-off valve provided within the interior of the fuel tank and spaced apart from the baffle plate.

10. The vehicle of claim 8, wherein the valve assembly further comprises:
 a biasing member; and
 a case in which the biasing member is at least partially positioned, the case having an upper end and an opposite lower end,
 wherein the valve cover is positioned at the upper end of the case and lockingly engages the case.

11. The vehicle of claim 10, wherein the valve assembly further comprises:
 a lower float positioned within the case; and
 an upper float positioned within the case, the biasing member positioned within the lower float.

12. The vehicle of claim 10, further comprising a bottom cap positioned at the lower end of the case and lockingly engaging the case.

13. The vehicle of claim 12, wherein the bottom cap is formed as a one-piece, monolithic structure with the housing member of the baffle plate.

14. The vehicle of claim 10, wherein the valve cover and the case are entirely positioned within the housing member.

15. A method comprising:
 providing a valve assembly comprising:
  a valve cover; and
  a weld plate provided at an upper end of the valve cover;
 providing a baffle plate comprising:
  a body having a plurality of spaced apart holes formed therein; and
  a housing member extending from the body, the housing member including an upper housing portion and a lower housing portion; and
 positioning the valve assembly within the housing member of the baffle plate such that the weld plate lockingly engages the upper housing portion; and
 welding the valve assembly to an interior-facing surface of a fuel tank of a vehicle.

16. The method of claim 15, wherein:
 the valve assembly further comprises:
  a biasing member; and
  a case in which the biasing member is at least partially positioned, the case having an upper end and an opposite lower end; and
 the valve cover is positioned at the upper end of the case and lockingly engages the case.

17. The method of claim 16, wherein the valve assembly further comprises:
 a lower float positioned within the case; and
 an upper float positioned within the case, the biasing member positioned within the lower float.

18. The method of claim 16, further comprising positioning a bottom cap at the lower end of the case and lockingly engaging the case.

19. The method of claim 18, further comprising forming the bottom cap as a one-piece, monolithic structure with the housing member of the baffle plate.

20. The method of claim 16, wherein the valve cover and the case are entirely positioned within the housing member.

* * * * *

UNITED STATES PATENT AND TRADEMARK OFFICE
CERTIFICATE OF CORRECTION

Page 1 of 1

PATENT NO. : 11,724,592 B2
APPLICATION NO. : 17/495976
DATED : August 15, 2023
INVENTOR(S) : Alexander Thaden et al.

It is certified that error appears in the above-identified patent and that said Letters Patent is hereby corrected as shown below:

On the Title Page

Column 2, item (57), abstract, Line(s) 4, after "surface", insert --of--.

In the Specification

In Column 1, Line(s) 43, after "surface", insert --of--.

In Column 3, Line(s) 2, after "respect", insert --to--.

In the Claims

In Column 8, Line(s) 43, Claim 1, after "surface", insert --of--.

In Column 9, Line(s) 12, Claim 7, delete "deice" and insert --device--, therefor.

Signed and Sealed this
Twenty-sixth Day of September, 2023

Katherine Kelly Vidal
*Director of the United States Patent and Trademark Office*